US009371423B2

(12) United States Patent
Davis et al.

(10) Patent No.: US 9,371,423 B2
(45) Date of Patent: Jun. 21, 2016

(54) METHODS AND APPARATUS FOR CROSSLINKING A SILICON CARBIDE FIBER PRECURSOR POLYMER

(71) Applicant: GENERAL ELECTRIC COMPANY, Schenectady, NY (US)

(72) Inventors: Peter Kennedy Davis, Niskayuna, NY (US); Slawomir Rubinsztajn, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 71 days.

(21) Appl. No.: 13/937,298

(22) Filed: Jul. 9, 2013

(65) Prior Publication Data

US 2015/0018448 A1    Jan. 15, 2015

(51) Int. Cl.
*C08G 77/60*  (2006.01)
*C08G 77/62*  (2006.01)
*B01J 19/08*  (2006.01)
(Continued)

(52) U.S. Cl.
CPC ............ *C08G 77/62* (2013.01); *B01J 19/085* (2013.01); *B01J 19/087* (2013.01); *B29C 35/0866* (2013.01); *C04B 35/571* (2013.01); *C04B 35/62281* (2013.01); *C08G 77/60* (2013.01); *C08J 3/28* (2013.01); *B01J 2219/0803* (2013.01); *B01J 2219/0879* (2013.01); *B29C 2035/0877* (2013.01)

(58) Field of Classification Search
CPC ........... C08G 77/62; C08G 77/60; C08J 3/28; B01J 19/087; B01J 19/085; B29C 35/0866; B29C 2035/0877
See application file for complete search history.

(56) References Cited

U.S. PATENT DOCUMENTS 3,861,955 A    1/1975  Lemelson
4,521,445 A *  6/1985  Nablo et al. .................. 427/496
(Continued)

FOREIGN PATENT DOCUMENTS

GB    2142210 A     1/1985
WO    9722371 A1    6/1997
WO    2011149732 A2   12/2011

OTHER PUBLICATIONS

Mirriam-Webster Online Dictionary. "Winding" Merriam-Webster Incorporated, Acessed on Nov. 16, 2015, http://www.merriam-webster.com/dictionary/winding.*
(Continued)

*Primary Examiner* — Bijan Ahvazi
*Assistant Examiner* — David L Miller
(74) *Attorney, Agent, or Firm* — John P. Darling

(57) ABSTRACT

The present disclosure generally provides methods and apparatus for efficiently crosslinking silicon carbide fiber precursor polymers with electron beam radiation. The methods and apparatus utilize a platform containing silicon carbide fiber precursor polymer. The temperature of the platform is regulated while the silicon carbide fiber precursor polymer is irradiated to thereby regulate the temperature of the irradiated silicon carbide fiber precursor polymer thereon. In this way, the temperature of the irradiated silicon carbide fiber precursor polymer is regulated via the platform both during and after it is subjected to radiation. At least one of the platform and the e-beam radiation mechanism may be translated with respect to the other to irradiate different portions of the silicon carbide fiber precursor polymer and, ultimately, the entirety of the silicon carbide fiber precursor polymer contained on the platform.

8 Claims, 5 Drawing Sheets

(51) Int. Cl.
  *B29C 35/08* (2006.01)
  *C04B 35/571* (2006.01)
  *C08J 3/28* (2006.01)
  *C04B 35/622* (2006.01)

(56) References Cited

U.S. PATENT DOCUMENTS

| | | | |
|---|---|---|---|
| 4,722,988 A * | 2/1988 | Porte et al. | 528/28 |
| 4,828,663 A | 5/1989 | Reedy et al. | |
| 4,916,093 A | 4/1990 | Okamura et al. | |
| 4,954,461 A * | 9/1990 | Okamura et al. | 501/95.1 |
| 5,093,096 A | 3/1992 | Okamura et al. | |
| 5,283,044 A | 2/1994 | Okamura et al. | |
| 6,486,481 B1 | 11/2002 | Tigera | |
| 7,964,171 B2 * | 6/2011 | Sugimoto et al. | 423/345 |
| 8,106,369 B2 | 1/2012 | Drenter | |
| 2003/0232495 A1 * | 12/2003 | Moghadam et al. | 438/623 |
| 2011/0212329 A1 | 9/2011 | Pope et al. | |
| 2012/0237765 A1 * | 9/2012 | Pope | C01B 31/36 428/367 |
| 2012/0248641 A1 | 10/2012 | Bauer et al. | |

OTHER PUBLICATIONS

International Search Report and Written Opinion issued in connection with corresponding Application No. PCT/US2014/042621 on Oct. 8, 2014.

Yializis et al; "A New High Temperature Multilayer Capacitor with Acrylate Dielectrics," 40th Electronic Componens and Technology Conference, vol. 1, pp. 169-176, May 20-23, 1990.

Cleland, et al; "Electron Beam Crosslinking of Wire and Cable Insulation," Technical Information of IBA Industrial.

Idesaki, et al; "Application of Electron Beam Curing for Silicon Carbide Fiber Synthesis From Blend Polymer of Polycarbosilane and Polyvinylsilane," Radiation Physics and Chemistry.

* cited by examiner

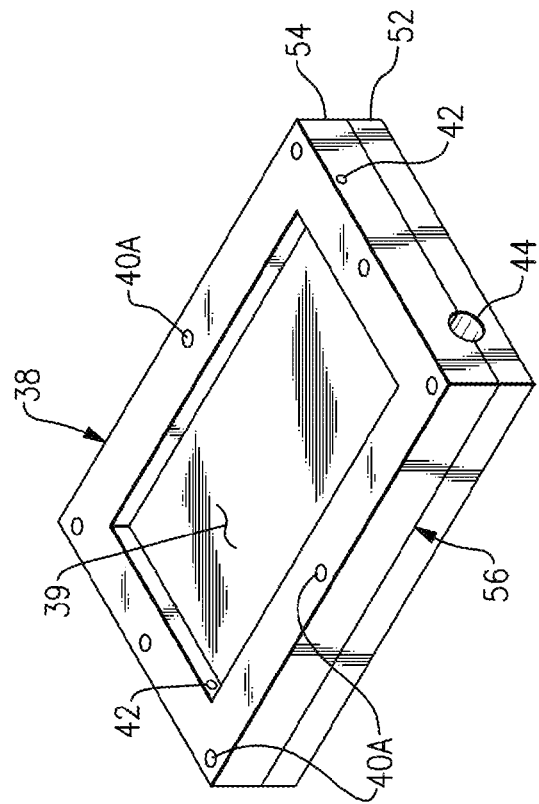
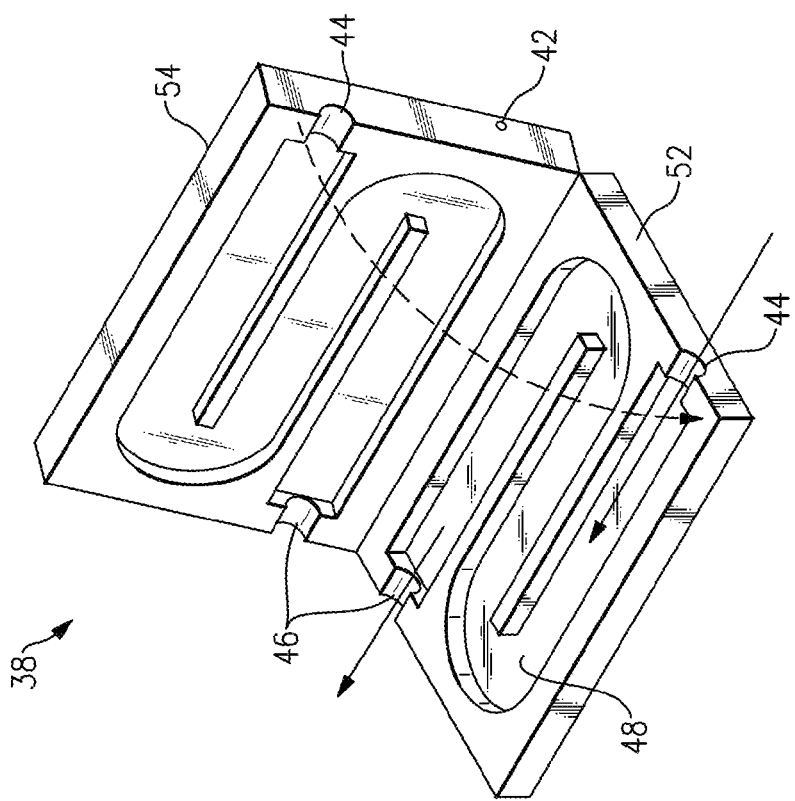
FIG.3B
FIG.3A

METHODS AND APPARATUS FOR CROSSLINKING A SILICON CARBIDE FIBER PRECURSOR POLYMER

BACKGROUND

The present invention generally relates to methods and apparatus for crosslinking a silicon carbide fiber precursor polymer. More particularly, the present invention relates to methods and apparatus for efficiently crosslinking a silicon carbide fiber precursor polymer by e-beam radiation.

Silicon carbide (SiC) is one of several advanced ceramic materials which are currently receiving considerable attention as electronic materials, as potential replacements for metals in engines, and for a variety of other applications where high strength, combined with low density and resistance to oxidation, corrosion and thermal degradation at high temperatures is desirable or necessary. Unfortunately, these extremely hard, non-melting ceramics are difficult to process by conventional forming, machining, or spinning applications rendering their use for many of these potential applications problematic. In particular, crosslinking SiC fiber polymer precursors (polycarbosilane and polydisilazane) via e-beam irradiation is the biggest bottleneck in the silicon carbide fiber production process.

Crosslinking SiC fiber polymer precursors (e.g., polycarbosilane and polydisilazane) makes the polymer infusible, so the fiber's dimensional integrity will be maintained during subsequent pyrolysis. Currently, e-beam is the typical mechanism used to effectuate the crosslinking of SiC fiber polymer precursors. However, the throughput of the current crosslinking process is severely limited by temperature increase incurred by the fibers due to the energy absorbed during irradiation. As a result, the radiation dose must be delivered at a rate slow enough to ensure that the SiC fiber polymer precursors do not reach their melting point, and thus lose their shape and/or fuse together.

In typical arrangements the radiation dose is regulated or limited through the use of a conveyor system. After a portion of a preceramic SiC fiber is irradiated, it rides around a long conveyor to cool down in the ambient atmosphere before returning to the e-beam for another small dose of radiation. The portions of the preceramic SiC fiber are passed under the e-beam enough times to receive the cumulative dose needed for effective crosslinking—thereby crosslinking the entire length of the fiber. When large doses (several MGy) are required to effectively crosslink a polymer fiber the radiation process becomes prohibitively expensive due to the large capital investment required in very long conveyor systems and long production times.

Thus, a need exists for methods and apparatus for efficiently crosslinking SiC fiber polymer precursors (e.g., polycarbosilane and polydisilazane) via e-beam while maintaining the fiber's dimensional integrity. Methods and apparatus facilitating e-beam curing of such fibers at much higher rates than prior art methods and apparatus would provide for valuable high throughput, cost-effective commercial silicon carbide fiber production with reduced footprint requirements.

BRIEF DESCRIPTION

In one aspect, a method of crosslinking a silicon carbide fiber precursor polymer is disclosed. The method includes exposing a first portion of silicon carbide fiber precursor polymer provided on a platform to e-beam radiation from an e-beam radiation mechanism. The method also includes translating at least one of the platform and the e-beam radiation with respect to the other and exposing a second portion of the silicon carbide fiber precursor polymer to e-beam radiation. The method further includes regulating the temperature of the platform to thereby prevent the temperature of the first and second portions of the carbide fiber precursor polymer from reaching their softening point due to the e-beam radiation.

In another aspect, an apparatus for crosslinking a silicon carbide fiber precursor polymer with electron beam radiation is disclosed. The apparatus includes a platform including a processing surface and a coolant channel. The apparatus also includes multiple layers of silicon carbide fiber precursor polymer positioned on the processing surface of the platform. In some embodiments, the coolant channel is configured to regulate the temperature of the processing surface and thereby the temperature of the multiple layers of silicon carbide fiber precursor polymer positioned thereon during crosslinking through the use of heat transfer fluid.

In another aspect, an apparatus for crosslinking a silicon carbide fiber precursor polymer is disclosed. The apparatus includes a platform, a translation mechanism, and an e-beam radiation mechanism configured to project e-beam radiation. The platform includes a processing surface, multiple layers of silicon carbide fiber precursor polymer positioned on the processing surface, and a coolant channel extending through the platform. The translation mechanism is configured to translate at least one of the platform and e-beam radiation projected from the e-beam radiation mechanism with respect to the other such that at a first configuration the e-beam radiation mechanism applies a first dose of e-beam radiation to a first portion of the silicon carbide fiber precursor polymer, and at a second configuration the e-beam radiation mechanism applies a first dose of e-beam radiation to a second portion of the silicon carbide fiber precursor polymer.

These and other objects, features, and advantages of this disclosure will become apparent from the following detailed description of the various aspects of the disclosure taken in conjunction with the accompanying drawings.

DRAWINGS

FIGS. 3A and 3B are perspective views of an exemplary temperature regulating base of an exemplary platform of the exemplary preceramic SiC fiber crosslinking apparatus of FIG. 1;

DETAILED DESCRIPTION

Figure 1:
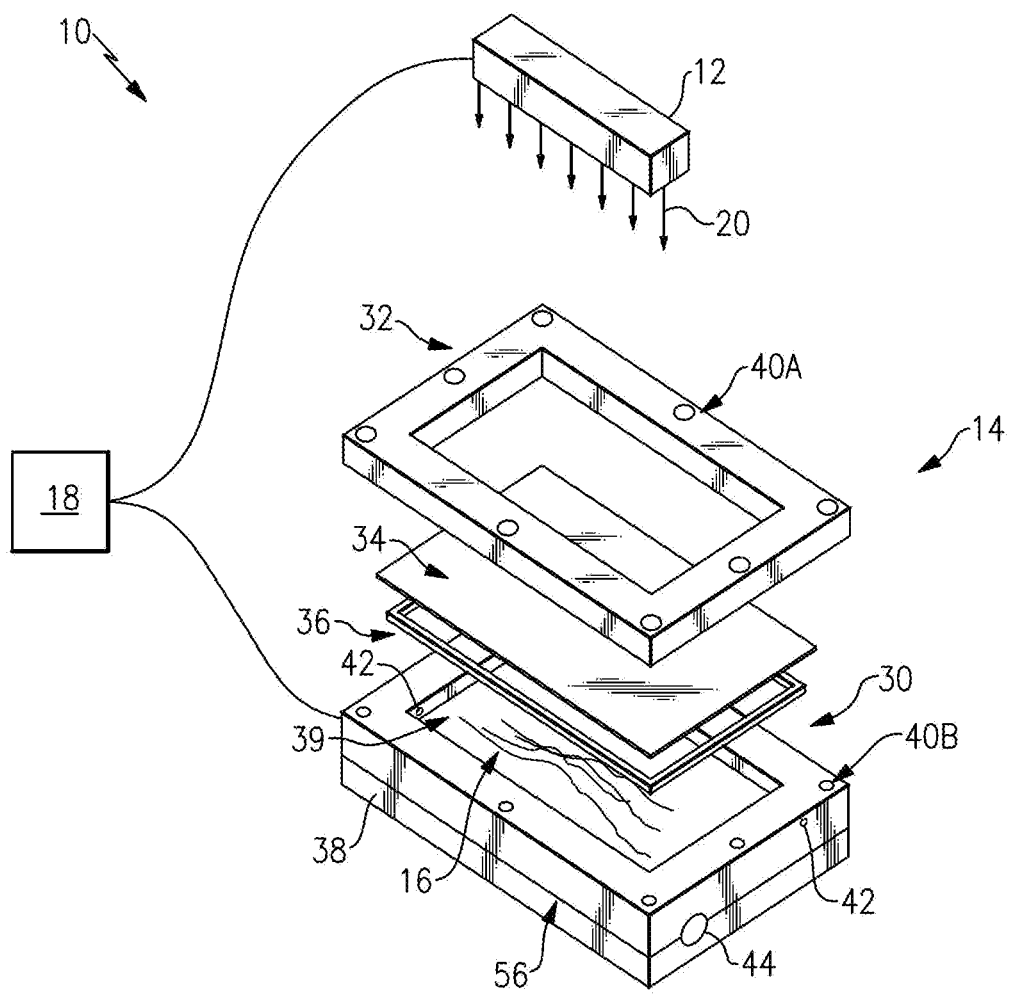
FIG. 1 is a perspective view of a preceramic SiC fiber crosslinking apparatus in accordance with an exemplary embodiment of the present disclosure.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The term "preceramic SiC fiber" (and its grammatical variations) is used herein to refer to silicon carbon (SiC) fiber polymer precursors or silicon carbon green fibers with or without some percentage of crosslinking The methods and apparatus of the present disclosure provide for crosslinking silicon carbide (SiC) fiber polymer precursors (e.g., polycarbosilane and polysilazane) via e-beam irradiation at much higher rates than can be achieved by current state of the art. In some embodiments, the polysilazane is polydisilazane. The methods and apparatus disclosed herein may be capable of producing at least about 20 tons per year crosslinked preceramic SiC fiber, and more preferably at least about 30 tons per year crosslinked preceramic SiC fiber, using a single e-beam installation. Such production rates of crosslinked preceramic SiC fiber provide at least about 500% performance advantage over current typical SiC fiber polymer precursors e-beam apparatus and methods. In some embodiments, testing has resulted in a 600% increase in throughput of crosslinked preceramic SiC fiber as compared to typical preceramic SiC fiber crosslinking e-beam apparatus and methods. The preceramic SiC fiber or SiC fiber polymer precursor crosslinking methods and apparatus of the present disclosure also provide for greater radiation dose uniformity to the processed or crosslinked preceramic SiC fibers as compared to typical bulk containers in conveyor systems. Still further, the preceramic SiC fiber or SiC fiber polymer precursor crosslinking methods and apparatus of the present disclosure provide for lower operating temperatures of the preceramic SiC fiber during the crosslinking process at the same radiation dose rate as compared to prior preceramic SiC fiber polymer precursors crosslinking apparatus and methods. In yet another aspect, the preceramic SiC fiber crosslinking methods and apparatus of the present disclosure provide for lower capital investment (e.g., fewer e-beam units, less infrastructure, smaller footprint, etc.) as compared to prior SiC fiber polymer precursors crosslinking apparatus and methods.

In one aspect, the methods and apparatus of the present disclosure provide active temperature regulation or maintenance to a platform on/in which SiC fiber polymer precursors are provided and subjected to e-beam radiation. In this way, the temperature regulation of the platform actively and continuously regulates the preceramic SiC fiber provided thereon (e.g., through conduction) both during and after e-beam radiation. During crosslink processing, the absorbed radiation produces heat in the preceramic SiC fiber, and the temperature regulation includes cooling the platform to thereby cool the partially crosslinked preceramic SiC fiber. The temperature regulation may be effective in maintaining the temperature of the preceramic SiC fiber below the softening point of the polymer precursor. The radiation process may include irradiating a first portion of SiC fiber polymer precursors provided on the platform. Movement of the platform and/or the radiation mechanism emitting the e-beam radiation may cause a second portion of the SiC fiber polymer precursors to be irradiated, and the first portion to no longer be subjected to radiation. As heat may be continuously withdrawn from the platform and, thereby, the preceramic SiC fibers, higher dose rates of e-beam radiation can be achieved during the crosslink process. Further, the temperature regulation of the preceramic SiC fibers via the platform can increase throughput as compared to prior art crosslinking methods and apparatus. The methods and apparatus of the present disclosure thereby eliminate the need for the cooling conveyor system, and thereby decreases investment cost and required footprint, associated with prior art preceramic SiC fiber crosslinking methods and apparatus.

Exemplary apparatus, systems, methods and the like for crosslinking preceramic SiC fiber is illustrated in FIGS. 1-3B and referenced generally by reference numeral 10. As shown in FIG. 1, the preceramic SiC fiber crosslinking apparatus and methods 10 may include several components, features and the like. The exemplary SiC fiber polymer precursor crosslinking apparatus and methods 10 shown in FIG. 1 includes an e-beam emitting mechanism 12, fiber platform 14, preceramic SiC fiber 16, and a translation mechanism 18.

The e-beam emitting mechanism 12 may be any mechanism effective in emitting at least one dose of e-beam radiation to the preceramic SiC fiber 16 provided on/in the platform 14. The beam current and electron energy metrics of the doses of e-beam radiation 20 emitted from the e-beam emitting mechanism 12 may be effective in at least partially crosslinking the SiC fiber polymer precursor 16, and thereby may depend upon, or at least be related to, a number of variables. For example, the physical properties of the SiC fiber polymer precursor 16 (e.g., softening point, melting point, etc.), the pile thickness and or arrangement of the preceramic SiC fiber 16 on the platform 14, the relative translation speed and orientation between the preceramic SiC fiber 16 and the e-beam radiation 20, the level or effectiveness of the temperature maintenance or cooling provided by the platform 14, the number of doses of e-beam radiation applied to the preceramic SiC fiber 16, and the desired level of crosslinking are some factors or variables that may affect the minimum, maximum or most effective dose of e-beam radiation 20 emitted from the e-beam emitting mechanism 12 during a crosslinking process.

In some embodiments, the e-beam emitting mechanism 12 (in combination with other components of the apparatus 10) may be configured to emit e-beam radiation at an accumulated dose between about 0.2 MGy and about 20 MGy, and preferably between about 5 MGy and about 20 MGy, depending upon the particular polymer of the preceramic SiC fiber 16. With preceramic SiC fiber 16 embodiments utilizing polydisilazane as the polymer, the e-beam emitting mechanism 12 (in combination with other components of the apparatus 10) may be configured to emit e-beam radiation 20 at an accumulated dose within the range of about 0.2 MGy to about 2 MGy. With preceramic SiC fiber 16 embodiments utilizing polycarbosilane as the polymer, the e-beam emitting mechanism 12 (in combination with other components of the apparatus 10) may be configured to emit e-beam radiation 20 at accumulated doses greater than 5 MGy if the precursor to SiC fiber 16 is polycarbosilane, and preferably within the range of about 10 MGy to about 20 MGy.

In some embodiments, the precursor to SiC fiber 16 is positioned in a pile of two or more layers on the platform 14. In some such embodiments, the thickness of the preceramic SiC fiber or SiC fiber polymer precursor 16 on the platform 14 is less than or equal to about one inch. In some such embodiments, the thickness of the preceramic SiC fiber 16 on/in platform 14 is less than or equal to about 0.5 inch. In some embodiments, the thickness of the preceramic SiC fiber 16 provided on/in the platform 14 is measured along the direction of the e-beam radiation 20 that intersects the preceramic SiC fiber 16. In some embodiments, the apparatus may be configured such that the e-beam radiation 20 intersects the preceramic SiC fiber 16 in a substantial normal or perpendicular orientation.

As mentioned above, the relative speed and orientation between the preceramic SiC fiber 16 and the e-beam radiation 20 of the SiC fiber polymer precursor crosslinking apparatus 10 may affect, or at least be related to, the minimum, maximum or most effective dose of e-beam radiation 20 emitted from the e-beam emitting mechanism 12 during a crosslinking process. As shown in FIG. 1, the SiC fiber polymer precursor crosslinking apparatus and methods 10 may include a translation mechanism 18. The translation mechanism 18 may be configured to translate at least one of the platform 14 (with the preceramic SiC fiber 16 contained therein/thereon) and the e-beam radiation 20 with respect to the other such that differing portions of the preceramic SiC fiber 16 receive a dose of e-beam radiation 20 (e.g., the entirety of the preceramic SiC fiber 16 on/in the platform 14 receives substantially the same dose of doses or e-beam radiation 20). In some embodiments the translation mechanism 18 may be configured to translate the e-beam radiation 20 with respect to the platform 14 and the SiC fiber 16 carried thereon/therein. In some such embodiments, a portion or aspect of the e-beam emitting mechanism 12 may be translated by the translation mechanism 18. In some embodiments, e-beam radiation 20 emitted from the e-beam emitting mechanism 12 may be translated by the translation mechanism 18. For example, the translation mechanism 18 may be apply an electric/magnetic field to the e-beam radiation 20 emitted from the e-beam emitting mechanism 12 in order to translate the e-beam radiation 20 with respect to the preceramic SiC fiber 16.

Figure 2A:
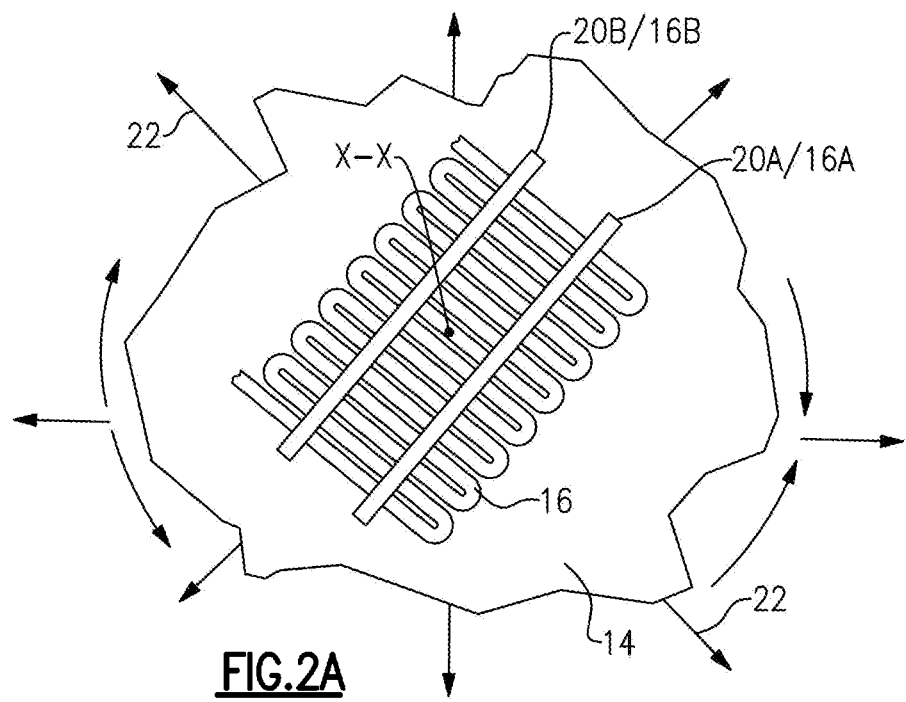
FIGS. 2A and 2B are top views of exemplary arrangements of preceramic SiC fiber on an exemplary platform of the exemplary preceramic SiC fiber crosslinking apparatus of FIG. 1.
Figure 2B:
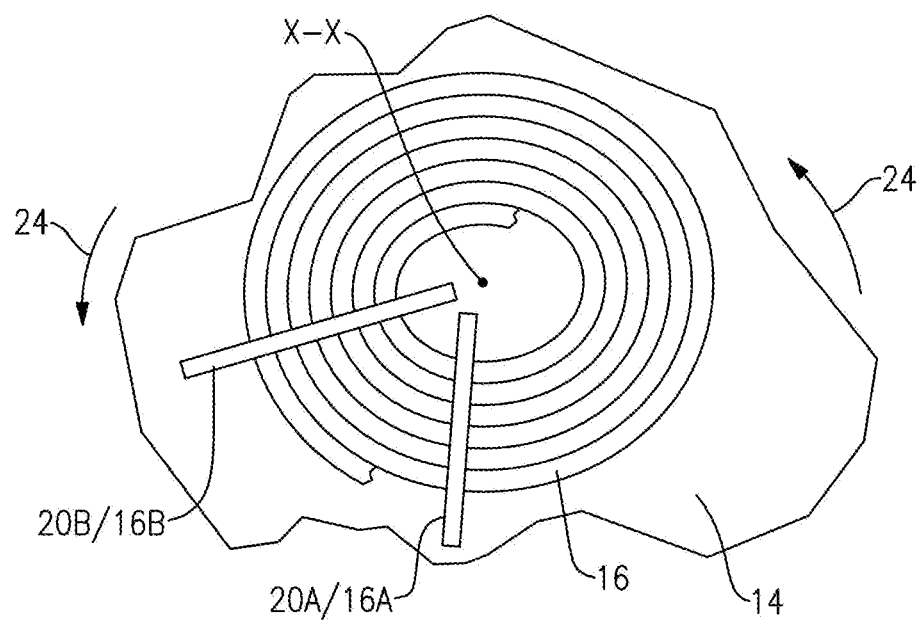

In some embodiments, the platform 14 carrying the preceramic SiC fiber 16 may be translated by the translation mechanism 18 with respect to the e-beam radiation 20 emitted from the e-beam emitting mechanism 12, as shown in FIGS. 2A and 2B. Specifically, the crosslinking apparatus 10 may be configured such that, initially, the platform 14 carrying the preceramic SiC fiber 16 is translated from a first positioned where the green fiber 16 does not receive e-beam radiation 20 emitted from the e-beam emitting mechanism 12 to a second positioned where at least a first portion 16A of the preceramic SiC fiber 16 receives a first dose of e-beam radiation 20A, as shown in FIGS. 2A and 2B. Such translation may be linear, arcuate, rotational, or any other type or direction of movement that is effective in positioning the preceramic SiC fiber 16 in a position to receive e-beam radiation 20 emitted from the e-beam emitting mechanism 12. In some embodiments, the size, shape, orientation, layout, pattern, etc of the emitted e-beam radiation 20A may be smaller than the size, shape, orientation, layout, pattern, etc of the preceramic SiC fiber 16 that receives the radiation 20—i.e., only a first portion 16A of the preceramic SiC fiber 16 at a first point in time may be exposed to e-beam radiation 20A during the crosslinking process, as shown in FIGS. 2A and 2B. For example, the e-beam emitting mechanism 12 may be configured to emit e-beam radiation 20 in a pattern that defines a smaller area as compared to the area of the preceramic SiC fiber 16 on the platform 14 that the radiation 20 intersects.

During the crosslinking process, the platform 14 carrying the green or preceramic SiC fiber 16 may be translated by the translation mechanism 18 with respect to the e-beam radiation 20 emitted from the e-beam emitting mechanism 12 to expose a second portion 16B of the preceramic SiC fiber 16 to a dose of e-beam radiation 20B. In this way, the translation mechanism 18 may be effective in exposing the entirety (or a portion) of the preceramic SiC fiber 16 to doses of e-beam radiation 20 from the e-beam emitting mechanism 12. Multiple passes of the e-beam radiation 20 from the e-beam emitting mechanism 12 over the preceramic SiC fiber 16 thereby results in multiple doses of radiation 20. As discussed further below, the temperature maintenance feature of the crosslinking apparatus and methods 10 allows for relatively rapid delivery of high doses of radiation 20.

Translating at least one of the platform 14 containing the green fiber 16 and the e-beam radiation 20 with respect to the other, such that multiple portions of the preceramic SiC fiber 16 receive at least one dose of radiation 20 (i.e., the preceramic SiC fiber 16 is crosslinked), may be performed at a constant speed or at a variable speed. For example, the arrangement or orientation of the preceramic SiC fiber 16 on the platform 14 (e.g., constant pile thickness) may dictate that a constant translation speed between the preceramic SiC fiber 16 and the e-beam radiation 20 via the translation mechanism 18 would result in substantially uniform doses of radiation throughout the preceramic SiC fiber 16. However, other arrangements or orientations of the preceramic SiC fiber 16 on the platform 14 may dictate that a variable translation speed between the preceramic SiC fiber 16 and the e-beam radiation 20 via the translation mechanism 18 would result in substantially uniform doses of radiation throughout the preceramic SiC fiber 16. In still other variations, non-uniform doses of radiation to the preceramic SiC fiber 16 may be desirable and achieved, at least in part, by the speed or path of the relative translation between the preceramic SiC fiber 16 and the e-beam radiation 20 via the translation mechanism 18. In some embodiments, the translation mechanism 18 is configured to translate at least one of the platform 14 containing the preceramic SiC fiber 16 and the e-beam radiation 20 with respect to the other such that the translation speed between the preceramic SiC fiber 16 and the e-beam radiation 20 is substantially constant and relatively great. In some embodiments, the translation speed between the preceramic SiC fiber 16 and the e-beam radiation 20 may be at least about 100 cm/min. In some embodiments, the translation speed between the preceramic SiC fiber 16 and the e-beam radiation 20 may be at least about 500 cm/min.

The translation of the preceramic SiC fiber 16 (via the platform 14) by the translation mechanism 18 during the crosslinking process may be linear, arcuate, rotational or any other type or direction of movement that is effective in positioning the preceramic SiC fiber 16 (via the platform 14) in a position such a second portion 16B of the preceramic SiC fiber 16 is irradiated, as indicated by the exemplary directional arrows emanating about the portion of the platform 14 shown in FIGS. 2A and 2B. In the embodiment shown in FIGS. 2A and 2B, the preceramic SiC fiber 16 is positioned on a substantially planar surface of the platform 14. In such an embodiment, as shown in FIG. 2A, the translation mechanism 18 may be configured to translate the platform 14, and thereby the preceramic SiC fiber 16 thereon, along a substantially linearly plane or direction 22. By translating the platform 14, and thereby the preceramic SiC fiber 16 thereon, back and forth along the substantially linearly plane or direction 22, the translation mechanism 18 can be effective in irradiating the entirety of the preceramic SiC fiber 16 with several doses of the e-beam radiation 20.

Another example of potential green or preceramic SiC fiber 16 layout on the platform 14 and the relative translation between the e-beam radiation 20 emitted from the e-beam emitting mechanism 12 and the platform 14 (and thereby the preceramic SiC fiber 16 thereon), is shown in FIG. 2B. As shown in FIG. 2B, in some embodiments the preceramic SiC fiber 16 may be positioned on a surface of the platform 14 in an arcuate, circular or spiral arrangement in one or more layers about an axis X-X that passes through the platform 14. Similarly, in some embodiments the translation mechanism 18 may be configured to translate the platform 14, and thereby the preceramic SiC fiber 16 thereon, in a rotational direction 24 about the X-X. Rotational movement 24 of the platform 14, and thereby the preceramic SiC fiber 16 thereon, via the translation mechanism 18 can be effective in irradiating the entirety of the preceramic SiC fiber 16 with several doses of the e-beam radiation 20 (one dose per revolution). In some such embodiments, the central area of the platform 14 about the axis of rotation X-X may not include preceramic SiC fiber 16 thereon as such preceramic SiC fiber 16 would receive substantially higher doses of radiation 20 than portions distal the axis of rotation X-X. In some such embodiments, the crosslinking apparatus and methods 10 may be configured such that the axis of rotation X-X of the platform 14, and thereby the preceramic SiC fiber 16, may be substantially parallel with the direction of the e-beam radiation 20.

An exemplary construction or arrangement of the green or preceramic SiC fiber platform 14 is shown in FIGS. 1, 3A and 3B. As shown in FIG. 1, the platform 14 may form or include a chamber 30 for containing the green SiC fiber 16 being processed (i.e., irradiated and thereby crosslinked). The chamber 30 may be substantially sealable or sealed such that the passage or migration of moisture and oxygen into the chamber 30, and thereby onto or about the preceramic SiC fiber 16 contained therein, is substantially prevented during processing. In some embodiments, the chamber 30 may be configured such that moisture and oxygen contained therein is less than or equal to about 50 ppm during processing to avoid significant reaction with the radicals. In some embodiments, the chamber 30 may be configured such that oxygen contained therein is less than or equal to about 10 ppm during processing. In some embodiments the chamber 30 is substantially hermetically sealable or sealed.

The chamber 30 may be formed, at least in part, by a flange 32, window member 34, seal member 36 and base 38, as shown in FIG. 1. The flange 32 may form an opening through which the e-beam radiation 20 may be projected and, ultimately, absorbed by the preceramic SiC fiber 14. The flange 32 may also be utilized, at least in part, to couple a window member 30 over the opening. The window member 30 may be any material or arrangement that is penetrable by e-beam radiation 20 at levels that are effective in crosslinking the preceramic SiC fiber 14 contained within the chamber 30. The window member 30 may also be any material or arrangement that is configured to substantially prevent the passage or migration of moisture and oxygen therethrough and thereby into the chamber and onto or about the SiC fiber 16 during crosslinking In some embodiments, the window member 34 is titanium foil. In some such embodiments, the titanium foil is about 2 mil thick.

In some embodiments, as shown in FIG. 1, the preceramic SiC fiber platform 14 may include at least one seal member 36 to ensure moisture and oxygen is substantially prevented from penetrating or migrating into the chamber 30 during processing (i.e., crosslinking) For example, at least one seal member 36 may be utilized to seal, at least in part, the window member 30 to the flange 32 and/or a base 38. The base 38 may include a recessed treatment surface 39 (or other feature) configured to provide a space between the base 38 and the window member 34 when the flange 32 and window member 34 are coupled to the base 38, as shown in FIG. 1. In this way, the treatment surface 39 may be configured to receive the preceramic SiC fiber 16 thereon. As also shown in FIG. 1, at least the flange 32 and base 38 may include corresponding apertures 40A and 40B, respectively, which facilitate coupling of the flange 32, window member 34, seal member 36 and base 38 to form the chamber 30 via fasteners (not shown). Further, the base 38 may include one or more port 42 configured for the removal of moisture and oxygen of the chamber 30 once the chamber 30 is sealed. For example, the at least one port 42 may be utilized to evacuate any moisture and oxygen from the chamber 30 after sealing, and/or to introduce an environment into the chamber 30 that facilities, or at least does not interfere with, crosslinking of the preceramic SiC fiber 16. For example, the at least one port 42 may be utilized to evacuate moisture and oxygen from the chamber 30 such that the chamber 30 contains less than or equal to about 50 ppm moisture and oxygen, and preferably less than or equal to about 10 ppm of oxygen, during processing (e.g., irradiation). Once moisture and oxygen are substantially removed from the chamber 30 (and/or an environment is put into the chamber 30), the at least one port 42 may be substantially sealed (e.g., hermetically sealed) to thereby seal the substantially oxygen and moisture free chamber 30.

As shown in FIG. 3A, the base 38 may include a coolant inlet 44, a coolant outlet 46 and a coolant channel 48 extending therebetween. The coolant inlet 44, coolant outlet 46 and a coolant channel 48 may allow heat transfer material or coolant (not shown) to flow through the base 38. In the exemplary embodiment shown in FIGS. 1-3B, the base 38 is of two-part construction including a first bottom portion 52 and a second top portion 54. The exemplary second top portion 54 includes or forms the treatment surface 39 one side, and includes or forms a portion of the coolant inlet 44, coolant outlet 46 and a coolant channel 48 on an opposing side, as shown in FIG. 3A. In such an arrangement, heat transfer material or coolant flowing through the coolant channel 48 can absorb heat conducting through the second top portion 54 (and potentially the first bottom portion 52) from the treatment surface 39 and, ultimately, from the irradiated preceramic SiC fiber 16 to maintain the temperature thereof during crosslinking When assembled, as shown in FIG. 3B, the first bottom portion 52 and the second top portion 54 may form a seal 56 therebetween such that a sealed coolant channel is formed through the base 39 (except for the inlet 44 and outlet 46). In some embodiments, the heat transfer material or coolant may be a coolant fluid. One or more pump or like mechanism (not shown) may be associated with the platform 14 to force the flow of the heat transfer material or coolant through the coolant channel 48 of the platform 14 from the coolant inlet 44 to the coolant outlet 46. In this way, the platform 14 (or apparatus or methods 10) includes an integrated heat exchanger that maintains or regulates the temperature of the preceramic SiC fiber 16 on the platform concurrently with the doses of e-beam radiation 20 during the crosslinking process (i.e., both during doses of radiation and after each dose of radiation).

The coolant channel 48, and coolant flowing therein during crosslinking, allows for relatively high dose rates of the e-beam radiation 20 to be applied without melting the preceramic SiC fiber 16. In some embodiments, the coolant channel 48, and coolant flowing therein, may be configured to maintain or regulate the temperature of the preceramic SiC fiber 16 below the softening point of the preceramic SiC fiber 16 during relatively high dose rates of e-beam radiation 20 (e.g., greater than or equal to about 12 kGy/sec) by maintaining or cooling the temperature of a portion of the platform 14 (e.g., via conduction, convection, or a combination thereof). As such, in some embodiments the temperature of heat transfer material or coolant flowing through the coolant channel 48 may be below the softening point of the preceramic SiC fiber 16 provided on the platform 14. In some embodiments, the coolant channel 48, and coolant flowing therein, may be configured to maintain or regulate the temperature of the preceramic SiC fiber 16 below the melting point of the preceramic polymer during relatively high dose rates of e-beam radiation 20 (e.g., greater than or equal to about 12 kGy/sec) by maintaining or cooling the temperature of a portion of the platform 14 (e.g., via conduction, convection, or a combination thereof). In some embodiments, the temperature of coolant flowing through the coolant channel 48 is at least about 50° C. below the softening point of the preceramic SiC fiber 16 within the chamber 30 of the platform 14. In some embodiments, the platform 14 includes polysilazane SiC fiber 16, and the coolant flowing through the coolant channel 48 is configured (e.g., temperature, flow rate, etc.) to maintain or prevent the temperature of the polysilazane SiC fiber 16 from exceeding about 100° C. In some embodiments, the platform 14 includes polycarbosilane SiC fiber 16, and the coolant flowing through the coolant channel 48 is configured (e.g., temperature, flow rate, etc.) to maintain or prevent the temperature of the polycarbosilane SiC fiber 16 from exceeding about 200° C.

Figure 4:
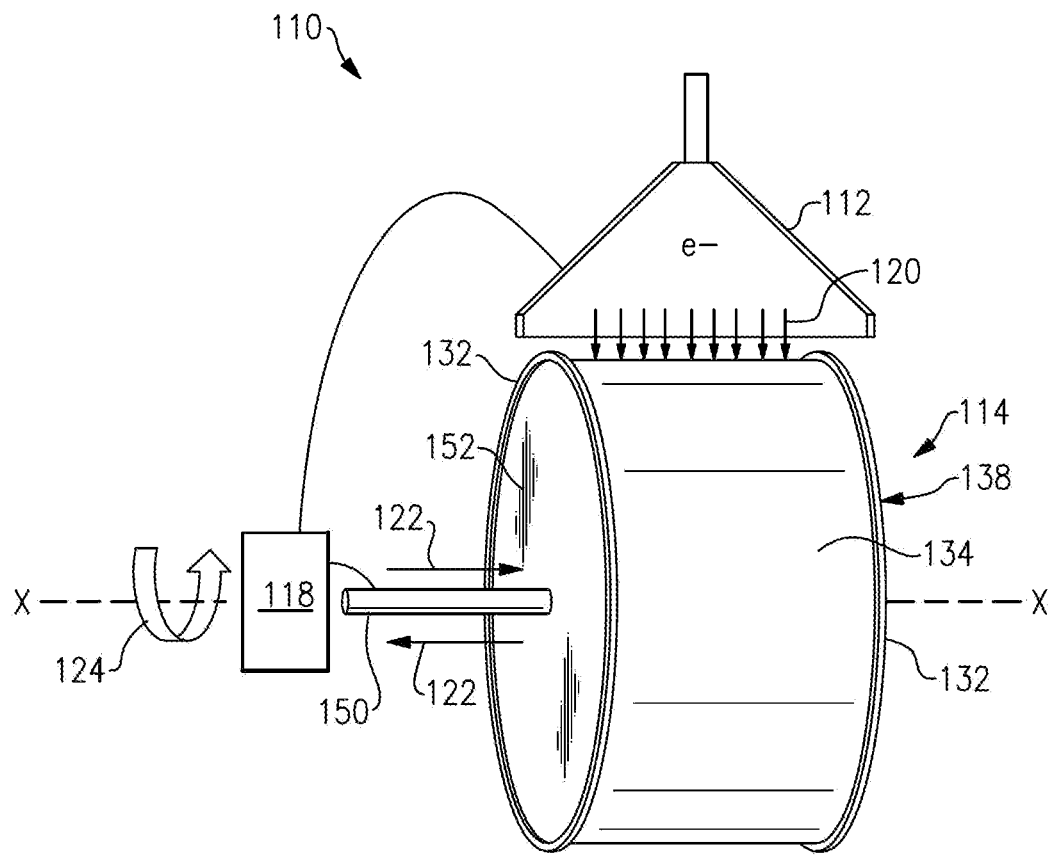
FIG. 4 is a perspective view of another preceramic SiC fiber crosslinking apparatus in accordance with an exemplary embodiment of the present disclosure.
Figure 5A:
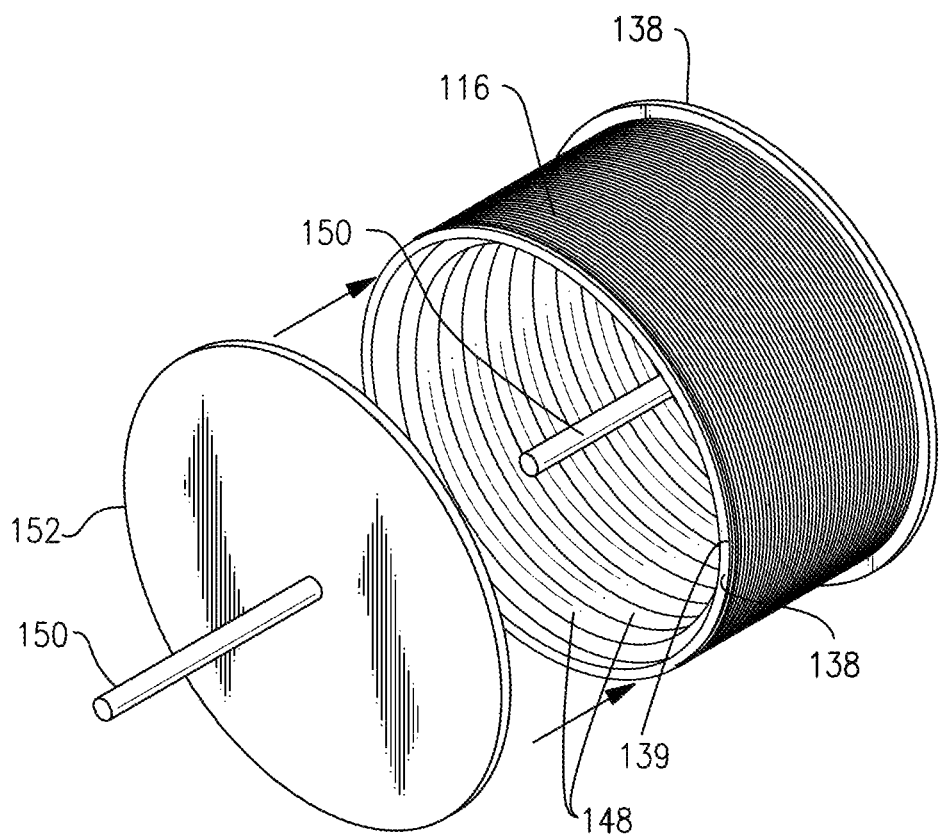
FIGS. 5A and 5B are perspective views of an exemplary temperature regulating platform of the exemplary preceramic SiC fiber crosslinking apparatus of FIG. 4.
Figure 5B:
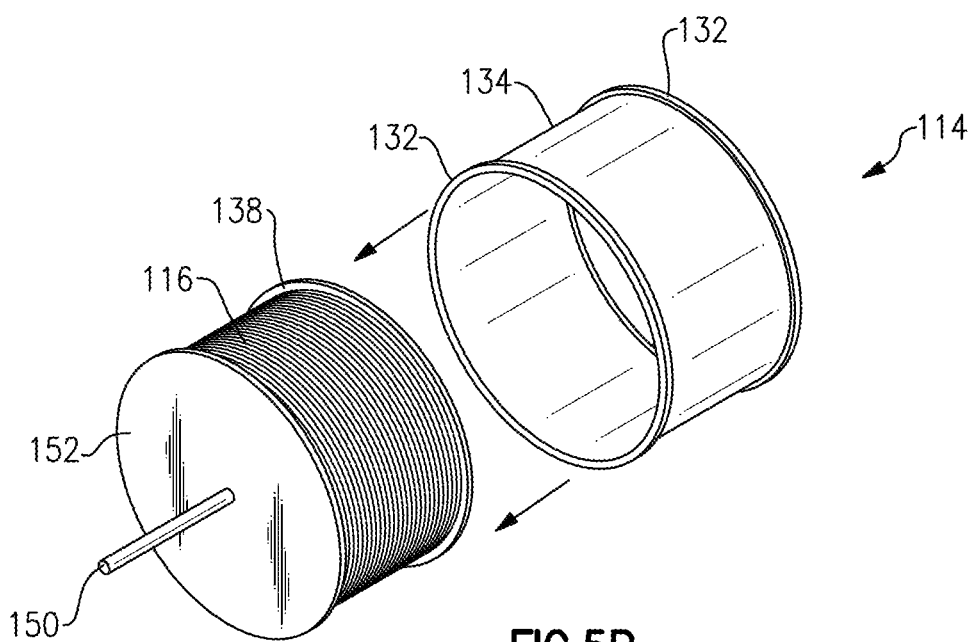

Another exemplary apparatus, systems, methods and the like for crosslinking preceramic SiC fiber is illustrated in FIGS. 4-5B and referenced generally by reference numeral 110. As shown in FIGS. 4-5B, the preceramic SiC fiber crosslinking apparatus and methods 110 may include several components, features and the like that function similar to the exemplary preceramic SiC fiber crosslinking apparatus, system, method and the like 10 described above with reference to FIGS. 1-3B and therefore like reference numerals preceded by the numeral "1" are used to indicate like elements, configurations, features, functions and the like. The description above with respect to other preceramic SiC fiber crosslinking apparatus, systems, methods, features, functions and the like, and subassemblies thereof, including description regarding alternative embodiments (i.e., modifications, variations or the like), equally applies to the preceramic SiC fiber crosslinking apparatus, systems, methods and the like 110 (and any alternative embodiments thereof). As shown in FIGS. 4-5B, inter alia, the exemplary preceramic SiC fiber crosslinking apparatus, systems, methods and the like 110 of FIGS. 4-5B differs from the embodiments 10 of FIGS. 1-3B with respect to the configuration or arrangement of the preceramic SiC fiber platform 114, the preceramic SiC fiber 116 provided on the platform 114, and the translation of the preceramic SiC fiber platform 114 (and thereby the preceramic SiC fiber 116 provided thereon) and/or the e-beam radiation 120 during the crosslinking process.

As shown in FIG. 4, the preceramic SiC fiber crosslinking apparatus and methods 110 are configured to crosslink (i.e., irradiate) the preceramic SiC fiber 116 provided on the platform 114 via rotation 124 of the platform 114 about an axis of rotation X-X by the translation mechanism 118. The processing surface 139 of the base 138 of the platform 114 carrying the preceramic SiC fiber 116 thereon is formed about, and potentially defines, the axis of rotation X-X. For example, the base 138 may form or include a drum, spool, cylinder or like shape such that the processing surface 139 is arcuate and extends, at least partially, about the axis of rotation X-X, as shown in FIGS. 4 and 5A. In some embodiments, the base 138 (and/or the processing surface 139 thereof) forms an axis, and such axis may be substantially aligned with the axis of rotation X-X of the processing surface 139. In some embodiments, the processing surface 139 of the base 138 of the platform forms a cylindrical shape with a diameter within the range of about 3 inches to about 10 feet, and preferably within the range of about 6 inches to about 3 feet. As shown in FIGS. 4 and 5B, in some embodiments the flange 132 and window member 134 may form a drum, spool, cylinder or like shape such that the flange 132 couples, at least in part, the window member 134 about the arcuate processing surface 139 of the base 138. In this way, the flange 138 and window member 134 may seal, at least partially, the preceramic SiC fiber 116 to the base 138.

The platform 114 may include an inner area that includes a cooling channel 148 for the flow of heat transfer material or coolant therethrough, as shown in FIG. 5A. In some embodiments, the cooling channel 148 may be defined by a conduit or other member or configuration effective in acting as a passageway for the coolant to flow therethrough from an inlet to an outlet. The cooling channel 148 may be configured to maintain, regulate or cool the processing surface 139 of the base 138 of the platform 114, and thereby the preceramic SiC fiber 116 provided on the processing surface 139. In some embodiments, the processing surface 139 of the base 138 of the platform 114 may be formed on an outer surface of a wall of the base 138, and the cooling channel 148 may be provided on an inner surface of the wall of the base 138 opposing the outer surface. In this way, heat may travel via conduction (and/or another heat transfer mechanism) from the processing surface 139 and through the wall of the base 138 to the inner surface and, eventually, to the coolant flowing through the cooling channel 148.

In some embodiments, as shown in FIGS. 4-5B, a cap member 152 may be coupled to the base 138. The cap member 152 may enclose an inner portion of the base 138, such as an inner portion including the cooling channel 148. The cap member 152 may provide for the sealing of the flange 138 and window member 134 over the preceramic SiC fiber 116 to create a sealed chamber or cavity for the preceramic SiC fiber 116. As noted above, the preceramic SiC fiber chamber, enclosure or cavity of the platform 114 for containing the preceramic SiC fiber 116 may be substantially hermetic, and may include one or more port to facilitate removal of moisture and oxygen from the chamber (and/or to introduce an environment into the chamber). As also shown in FIGS. 4-5B, a translation member 150 may be associated with the cap member 152 and the base 138. The at least one translation member 150 may be configured to be utilized by the translation mechanism 118 to translate (e.g., rotate) the platform 114 (and thereby the preceramic SiC fiber 116 thereon) about the axis of rotation X-X.

As shown in FIG. 5A, the processing surface 139 of the drum-like base 138 of the platform 114 may be wound with preceramic SiC fiber 116. In some embodiments, the preceramic SiC fiber 116 on the platform 114 may be wound directly from a spinneret of a fiber spinning line. The preceramic SiC fiber 116 may be wound to form a pile of multiple layers of preceramic SiC fiber 116. In some such embodiments, the thickness of the preceramic SiC fiber 116 of platform 114 may be less than or equal to about one inch. In some embodiments, the thickness of the preceramic SiC fiber 116 of platform 114 may be about 0.8 inch.

Once the platform 114 is wound with preceramic SiC fiber 116, the cap member 152 and/or translation member 150 may be coupled to the base 138 of the platform 114, as shown in FIG. 5A. Once the cap member 152 is coupled to the platform 114 wound with SiC fiber 116, the flange 132 and window member 134 may be coupled to the platform 114 to form a substantially sealed area, cavity, enclosure or chamber about the preceramic SiC fiber 116. As noted above, the sealed area, cavity, enclosure or chamber about the preceramic SiC fiber 116 may be substantially evacuated of oxygen and/or moisture. Further, one or more ports may be utilized to introduce an environment into the sealed area, cavity, enclosure or chamber about the preceramic SiC fiber 116 that facilities crosslinking of the preceramic SiC fiber 116 via e-beam radiation 120. As shown in FIG. 4, the sealed platform 114 may be translated in a direction 122 such that e-beam radiation 120 emitted from the e-beam radiation mechanism 112 passes through the window member 134 and intersects the preceramic SiC fiber 116. In some embodiments, such translation of the platform 114 may be provided by the translation mechanism 118. As also shown in FIG. 4, in some embodiments the e-beam radiation mechanism 112 and the platform 114 may be arranged or oriented such that e-beam radiation 120 extends over the entirety, or at least a substantial portion, of the length of the preceramic SiC fiber 116 in a direction extending along the axis of rotation X-X of the platform 114. In some embodiments, the e-beam radiation 120 emitted from the e-beam radiation mechanism 112 may travel in a direction that extends substantially perpendicularly through the axis of rotation X-X of the platform 114. In this way, the e-beam radiation 120 emitted from the e-beam radiation mechanism 112 may extend substantially perpendicular or normal to the preceramic SiC fiber 116 on the platform 114.

In such drum-like rotation arrangements of the preceramic SiC fiber crosslinking apparatus and methods 110, the e-beam radiation mechanism 112 may emit e-beam radiation 120 and the platform 114 may be rotationally translated 124 about the axis of translation X-X to irradiate the preceramic SiC fiber 116 and thereby crosslink (at least partially) the preceramic SiC fiber 116. In some embodiments, such rotational translation 124 may be provided by the translation mechanism 118. The speed at which the platform 114 (and thereby the preceramic SiC fiber 116 thereon) is rotated and the strength of the dose of e-beam radiation 120 may be configured such that one full revolution of the platform 114 results in a uniform dose of e-beam radiation 120 to all of the preceramic SiC fiber 116 provided on the platform 114. Further, during irradiation, coolant may be pumped or otherwise passed through the cooling channel 148 extending through the platform 114 to cool the processing surface 139 in contact with the wound preceramic SiC fiber 116. In this way, the cooling channel 148 and coolant therein may be utilized to maintain or regulate the temperature of the irradiated preceramic SiC fiber 116 both while a particular portion of the preceramic SiC fiber 116 is subjected to e-beam radiation 120 and while that portion travels about the axis of rotation X-X and before it receives a second dose of e-beam radiation 120. This cycle may be repeated such that the entirety, or at least a substantial portion, of the preceramic SiC fiber 116 on the platform 114 is crosslinked to a predetermined level via the radiation 120 (enough doses are applied), and preceramic SiC fiber 116 is prevented from reaching its softening point or melting point. After crosslinking, at least one of the flange 132, window material 134, translation member 150 and cap member 152 may be removed from the platform such that the drum-like platform 114 essentially forms an accessible spool of crosslinked preceramic SiC fiber 116.

The arrangements and/or shapes of the components discussed or illustrated herein are only illustrative for the understanding of the cell structure; and are not meant to limit the scope of the invention. The exact shape, position, arrangement, orientation and the like of the components may vary.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of crosslinking a silicon carbide fiber precursor polymer, comprising:
exposing a first portion of silicon carbide fiber precursor polymer provided on a platform to e-beam radiation, wherein the silicon carbide fiber precursor polymer is provided on the platform by winding the silicon carbide fiber precursor polymer on the platform, wherein winding the silicon carbide fiber precursor polymer on the platform comprises winding the silicon fiber precursor polymer to form a pile of multiple layers in the direction of the e-beam radiation intersecting the silicon carbide fiber precursor polymer;
translating at least one of the platform and the e-beam radiation with respect to the other and exposing a second portion of the silicon carbide fiber precursor polymer to e-beam radiation; and
regulating the temperature of the platform to prevent the temperature of the first and second portions of the silicon carbide fiber precursor polymer from reaching their softening point due to the e-beam radiation, wherein the silicon carbide fiber precursor polymer is polycarbosilane, polysilazane, or polydisilazane.

2. The method according to claim 1, wherein regulating the temperature of the platform includes removing heat from the platform to remove heat from the first and second portions of the carbide fiber precursor polymer.

3. The method according to claim 1, wherein exposing a first portion of the silicon carbide fiber precursor polymer to e-beam radiation and exposing a second portion of the silicon carbide fiber precursor polymer to e-beam radiation includes projecting e-beam radiation at an accumulated dose between 0.2 MGy and 20 MGy.

4. A method according to claim 1, wherein translating at least one of the platform and the e-beam radiation with respect to the other includes rotating the platform about an axis of rotation of the platform.

5. A method of crosslinking a silicon carbide fiber precursor polymer, comprising:
exposing a first portion of silicon carbide fiber precursor polymer provided on a platform to e-beam radiation;
translating at least one of the platform and the e-beam radiation with respect to the other and exposing a second portion of the silicon carbide fiber precursor polymer to e-beam radiation, wherein translating at least one of the platform and the e-beam radiation with respect to the other includes rotating the platform around an axis of rotation;
regulating the temperature of the platform to prevent the temperature of the first and second portions of the carbide fiber precursor polymer from reaching their softening point due to the e-beam radiation; and
positioning the silicon carbide fiber precursor polymer on a first surface of the platform, and wherein the axis of rotation of the platform is substantially normal to the first surface of the platform, wherein the silicon carbide fiber precursor polymer is polycarbosilane, polysilazane, or polydisilazane.

6. A method according to claim 4, further including positioning the silicon carbide fiber precursor polymer on a first surface of the platform, and wherein the first surface extends at least partially about the axis of rotation of the platform.

7. A method according to claim 1, wherein exposing the first portion of the silicon carbide fiber precursor polymer to e-beam radiation includes translating at least one of the platform and the e-beam radiation with respect to the other from a first arrangement in which e-beam radiation emitted from the beam radiation mechanism would not intersect the silicon carbide fiber precursor polymer on the platform to a second arrangement in which e-beam radiation emitted from the e-beam radiation mechanism intersects with the first portion of the silicon carbide fiber precursor polymer.

8. The method according to claim 1, wherein exposing the first portion of the silicon carbide fiber precursor polymer to e-beam radiation and exposing the second portion of the silicon carbide fiber precursor polymer to e-beam radiation includes projecting e-beam radiation at an accumulated dose between 10 MGy and 20 MGy.

* * * * *